United States Patent [19]
Simon et al.

[11] Patent Number: 5,626,981
[45] Date of Patent: May 6, 1997

[54] RECHARGEABLE LITHIUM ELECTROCHEMICAL CELL

[75] Inventors: Bernard Simon, Issy Les Moulineaux; Jean-Pierre Boeuve, Marcoussis, both of France

[73] Assignee: SAFT, Romainville, France

[21] Appl. No.: 426,665

[22] Filed: Apr. 21, 1995

[30] Foreign Application Priority Data

Apr. 22, 1994 [FR] France .................. 94 04889

[51] Int. Cl.$^6$ .............. H01M 4/38; H01M 4/48; H01M 6/16
[52] U.S. Cl. .............. 429/105; 429/137; 429/197; 429/198
[58] Field of Search .............. 429/197–198, 429/137, 105

[56] References Cited

U.S. PATENT DOCUMENTS

| | | | |
|---|---|---|---|
| 5,292,601 | 3/1994 | Sugeno et al. | 429/197 |
| 5,352,548 | 10/1994 | Fujimoto et al. | 429/197 |
| 5,389,467 | 2/1995 | Herr et al. | 429/197 X |
| 5,472,809 | 12/1995 | Perton et al. | 429/197 |
| 5,484,669 | 1/1996 | Okuno et al. | 429/197 X |

FOREIGN PATENT DOCUMENTS

0573266A1  12/1993  European Pat. Off. .

OTHER PUBLICATIONS

*Patent Abstracts of Japan*, vol. 11, No. 309 (E–547) 8 Oct. 1987 & JP–A–62 100 950 (Showa Denko).

*Patent Abstracts of Japan*, vol. 11, No. 309 (E–547) 8 Oct. 1987 & JP–A–62 100 4948 (Showa Denko).

*Primary Examiner*—Donald R. Valentine
*Attorney, Agent, or Firm*—Sughrue, Mion, Zinn, Macpeak & Seas

[57] ABSTRACT

The present invention concerns a rechargeable lithium electrochemical cell comprising an anode containing a carbon-containing material with a degree of crystallinity which is greater than 0.8 and an electrolyte comprising a lithium salt and a mixture of at least two aprotic organic solvents, of which the first solvent has a high dielectric constant and the second solvent has low viscosity. The electrolyte further contains a soluble compound of the same type as at least one of said solvents and contains at least one unsaturated bond, and which can be reduced at the anode at a potential of more than 1 volt with respect to lithium to form a passivation layer.

14 Claims, 2 Drawing Sheets

RECHARGEABLE LITHIUM ELECTROCHEMICAL CELL

The present invention concerns a rechargeable lithium electrochemical cell with a carbon anode.

In order to eliminate dendrite growth, metallic lithium as currently used for the anode has tended to be replaced by compounds into which lithium ions intercalate, reduction being effected at a potential close to that of lithium metal. A great deal of work has concerned carbon-containing materials into which lithium can intercalate between their graphite planes. The most suitable of the existing carbon-containing materials as regards both thermodynamics and intercalation kinetics are those with the highest degree of crystallinity. The presence of structural defects increases the intercalation potential with respect to the potential of the lithium metal and limits ion mobility in the material. Thus graphites can effectively reach the theoretical reversible capacity which is 370 mAh/g of carbon.

When a carbon-containing material with a high degree of crystallinity is used, however, the carbon-containing material undergoes exfoliation leading to irreversible losses in capacity which are of greater or lesser extent depending on the size of the phenomenon. Exfoliation is principally due to intercalation of lithium ions from the electrolyte in which they are solvated by solvent molecules. These molecules can intercalate with the lithium ion between the graphite planes and cause exfoliation of the material. This is due to electrochemical reduction of the solvent within the structure.

This phenomenon is minimized in a first solution by modifying the carbon-containing material. The use of materials with a more disordered structure has been proposed, for example in European patent EP-A-0 357 001, but those materials have lower performances than crystalline materials (200 mAh/g). Proposals have also been made to modify the surface of the graphite particles by coating them with a material which is more disordered than the core material of the particles, for example in EP-A-0 520 667. Coating is difficult to carry out, however, and the material obtained exhibits reduced insertion kinetics.

A further possible solution to limiting carbon exfoliation is to introduce an additive into the electrolyte. Addition of a crown ether (12-crown-4) at the same concentration as that of the lithium salt to a propylene carbonate based electrolyte is described by Dahn et. al. (Physical Review B, 24, No. 10 (1990), 6424–6432). Chusid et. al. (Jnl. of Power Sources, 43–44 (1993), 47–64) also describe the addition of a crown ether but they obtain a lower intercalation ratio than that obtained with a methyl formiate based electrolyte containing carbon dioxide. Such additives reduce the conductivity of the electrolyte and they are also expensive.

The present invention particularly concerns a rechargeable electrochemical cell with high energy per unit mass and per unit volume and which remains stable throughout its lifetime. It particularly concerns a cell with a carbon anode in which exfoliation of the carbon-containing material is minimized.

The present invention thus provides a rechargeable lithium electrochemical cell comprising a cathode, an anode containing a carbon-containing material with a degree of crystallinity which is greater than 0.8 and an electrolyte comprising a lithium salt and a mixture of at least two aprotic organic solvents, of which the first solvent has a high dielectric constant and the second solvent has low viscosity, characterized in that the electrolyte further contains a soluble compound of the same type as at least one of said solvents and contains at least one unsaturated bond, and which can be reduced at the anode at a potential of more than 1 volt with respect to lithium to form a passivation layer.

The degree of crystallinity, also termed the degree of graphitization $d_g$, of a carbon-containing material is defined from the distance between the graphite planes, which is 0.3354 nm for a perfect graphite crystal, by the relationship: $d_g = (0.344 - d_{002})/0.0086$, where $d_{002}$ is the distance between the graphite planes obtained using conventional X-ray spectrographic techniques. The degree of crystallization of a perfect Graphite crystal equals 1. A degree of crystallinity of more than 0.8 indicates that the carbon-containing material of the anode is highly crystalline. Preferably, natural or synthetic graphite is used, also certain fibres known as graphite fibres, which have been treated at high temperature. All these materials have a high degree of crystallinity and large crystallite size.

During the first charge of the cell, the soluble compound added to the electrolyte reduces at a potential which is higher than the intercalation potential of the solvated lithium ions. On reducing, it forms a passivation layer on the carbon-containing material before any intercalation of the lithium. This then constitutes a physical barrier preventing intercalation of the solvent molecules surrounding the lithium ions. The lithium ion thus penetrates into the carbon by itself and exfoliation is prevented.

The compound is of the same type as at least one of the solvents and contains at least one unsaturated bond. The passivation layer which is formed is thus of the same type as that produced in analogous conventional electrolytes which do not contain the compound. The presence of an unsaturated bond facilitates reduction of the compound at a high potential.

In one preferred embodiment, the mixture of solvents comprises at least one carbonate in which the bonds are saturated; the compound is selected from vinylene carbonate and its derivatives. The term "derivatives of vinylene carbonate" means compounds containing at least one unsaturated bond associated with one carbon atom of the cycle, for example propylidene carbonate, ethylidene ethylene carbonate (or 4-ethylidene 1,3 dioxolane-2-one), or isopropylidene ethylene carbonate (or 4-isopropylidene 1,3 dioxolane-2-one), respectively represented as follows:

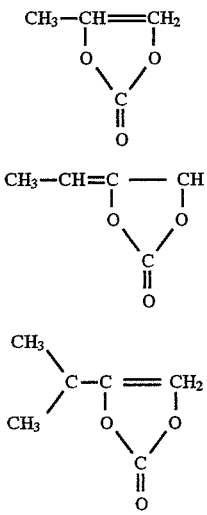

The compound is preferably added in a proportion of 0.01% to 10% by weight of the mixture of solvents. This quantity is generally sufficient. A larger quantity may be required when using graphites with a very high specific surface area. Up to 50% of the compound can be added without problems.

The mixtures of solvents used in the high conductivity electrolyte for this type of cell generally comprise a number of solvents of which at least a first solvent has a dielectric constant ε of more than 20 to favor dissociation of the lithium salt and a second solvent with a viscosity η at room temperature of less than 0.8 cP, to improve ion mobility. Other solvents, which may have different properties, can be added to these solvents.

The first solvent is preferably selected from ethylene carbonates (EC) (or 1,3 dioxalone-2-one) and propylene carbonates (PC) (or 4-methyl 1,3 dioxalone-2-one), dipropyl carbonate, acid anhydrides, n-methyl pyrrolidone, n-methyl acetamide (MA), n-methyl formamide, dimethyl formamide (DMF), γ-butyrolactone (γ-But), acetonitrile, sulfolane, dimethyl sulfoxide (DMSO), and dimethyl sulfite (DMS).

The second solvent is preferably selected from ethers such as 1,2-diethoxyethane (DEE), 1,2-dimethoxyethane (DME) and 1,2-dibutoxyethane (DBE), esters such as ethyl or methyl acetate, butyrate, propionate and formiate, diethyl carbonates (DEC) and dimethyl carbonates (DMC), 1,3-dioxolane (DOL) and its derivatives such as methyl dioxolane (MeDOL), tetrahydrofuran (THF) and its derivatives such as 2-methyl tetrahydrofuran (MeTHF), and propylene oxide (PO).

Most mixtures of at least two solvents which are normally used in lithium electrochemical cells and which contain a first solvent with a high dielectric constant and a second solvent with a low viscosity, can also be used.

The lithium salt is selected from lithium perchlorate LiClO$_4$, lithium hexafluoroarsenate LiAsF$_6$, lithium hexafluorophosphate LiPF$_6$, lithium tetrafluoroborate LiBF$_4$, lithium trifluoromethane sulfonate LiCF$_3$SO$_3$, lithium trifluoromethane sulfonimide LiN(CF$_3$SO$_2$)$_2$, and lithium trifluoromethane sulfonemethide LiC(CF$_3$SO$_2$)$_3$, and their mixtures.

The cathode is selected from transition metal oxide based cathodes selected from lithiated oxides of manganese, nickel and cobalt, and their mixtures.

Further features and advantages of the present invention will become clear from the following examples of embodiments which are given by way of non limiting illustration and with reference to the accompanying drawing, in which.

In FIGS. 1 to 4, the ordinate represents the potential V of the cell in volts and the abscissa represents the capacity per unit mass C of the cell in mAh/g referred to the weight of carbon in the anode.

EXAMPLE 1

Prior art

An electrode was formed from a mixture of 90% by weight of a highly crystalline graphite type carbon-containing material with 5% of "YS" acetylene black and 5% of polytetrafluoroethylene (PTFE).

The pellet was then assembled as the anode in a rechargeable button type cell, format CR 2430 (Diameter 24 mm, thickness 3 mm), facing a cobalt oxide cathode. The lithiated cathode was designed to be overcapacitive in order to observe the phenomena occurring at the anode.

The cell also contained a separator formed from microporous polyethylene sold under the trade name "Celgard 2502" by Celanese Corporation, and an electrolyte containing a mixture of solvents and a lithium salt. The mixture of solvents was composed of one part by weight of propylene carbonate (PC) (ε=64.4 at 25° C.), one part by weight of ethylene carbonate EC (ε=95.3 at 25° C.) and two parts by weight of dimethyl carbonate (DMC) (η=0.6 cP at 25° C.). The lithium salt was lithium trifluoromethane sulfonimide LiTFSI (LiN(CF$_3$SO$_2$)$_2$), added at a concentration of 1M.

Figure 1:
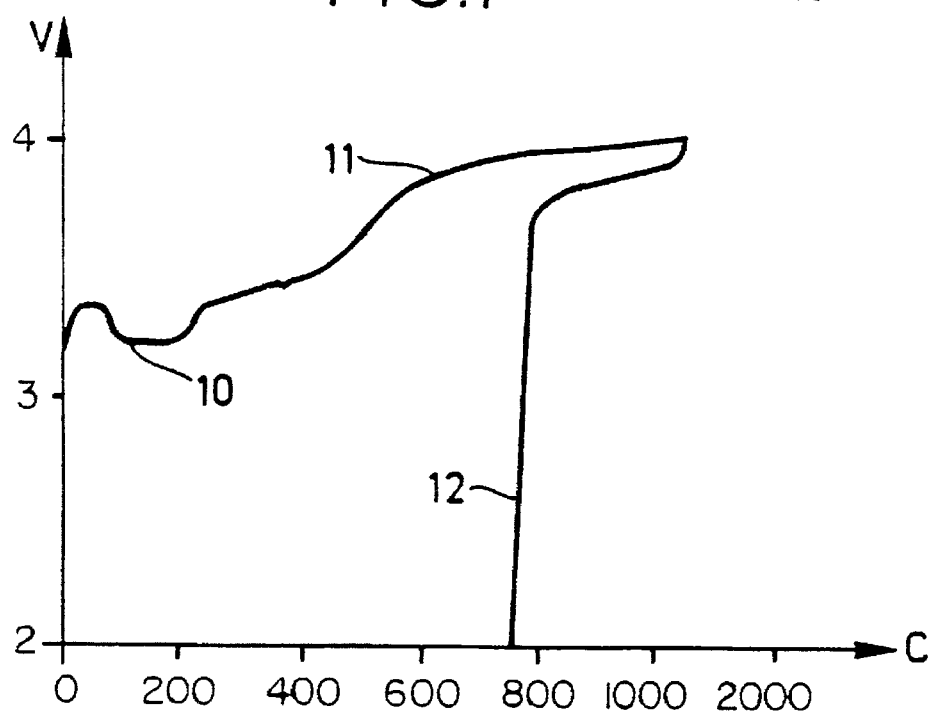
FIG. 1 shows a first charge and discharge curve for a prior art cell showing considerable exfoliation.

The cell was then tested at room temperature with constant current cycling at 20 mA/g of carbon, charging to a voltage of 4 Volts and discharging to a voltage of 2 Volts. Curve 11 in FIG. 1 represents the first charge of the prior art cell and exhibits a dip 10 illustrating the size of the carbon exfoliation phenomenon. Curve 12 of FIG. 1 represents the subsequent discharge of the cell.

Although 1050 mAh/g of carbon was charged, discharge restored only 300 mAh/g. The losses associated with carbon exfoliation were thus very high since they represented more than 70% of the charged capacity.

EXAMPLE 2

A cell was produced in accordance with the invention which was analogous to that described in Example 1 except that it contained an analogous electrolyte to which 5% by weight of vinylene carbonate (VC) was added relative to the weight of the mixture of solvents.

Figure 2:
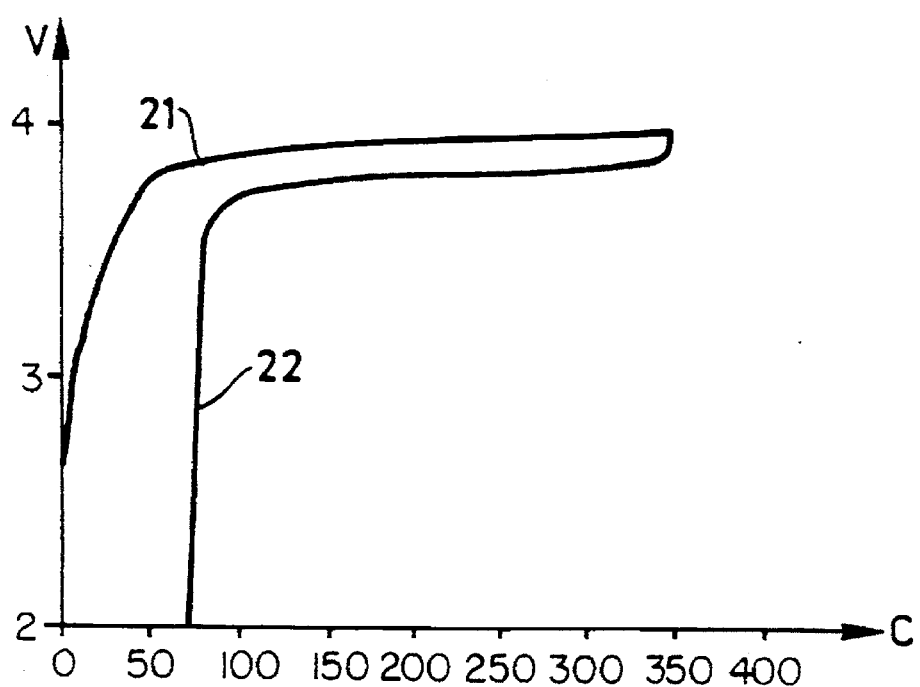
FIG. 2 shows a first charge and discharge curve for a cell in accordance with the present invention.

The test conditions were analogous to those given for Example 1. Curve 21 of FIG. 2 represents the first charge of the cell and exhibits no dip: in the presence of VC, carbon exfoliation no longer occurs. Curve 22 of FIG. 2 represents the subsequent discharge of the cell.

Discharge restored 275 mAh/g of the 350 mAh/g which had been charged, i.e., almost 79% of the charged capacity. The actual intercalated capacity was thus substantially larger for the cell of the invention.

EXAMPLE 3

Prior art

A prior art cell was produced which was analogous to that described in Example 1 but which contained an electrolyte comprising a mixture of solvents composed of one part by weight of ethylene carbonate EC (ε=95.3 at 25° C.), and one part by weight of DMC (η=0.6 cP at 25° C.).

Figure 3:
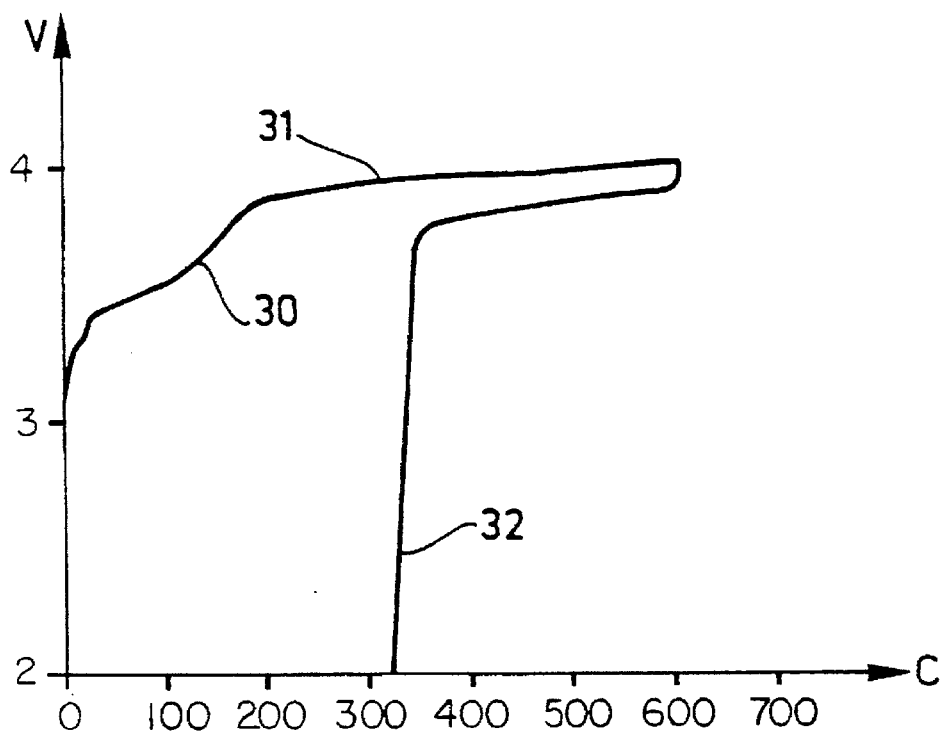
FIG. 3 shows a first charge and discharge curve for a variant of the cell of the prior art showing considerable exfoliation.

The test conditions were analogous to those given in Example 1. Curve 31 in FIG. 3 represents the first charge of the prior art cell on which a dip 30 is observed, indicating carbon exfoliation. Curve 32 of FIG. 3 represents the subsequent discharge of the cell.

While 610 mAh/g of carbon was charged, discharge restored only 300 mAh/g. The losses associated with carbon exfoliation were thus very high since they represented more than 50% of the charged capacity.

EXAMPLE 4

A cell was produced in accordance with the invention which was analogous to that described in Example 1 except that it contained an electrolyte analogous to that of Example 3 but to which 5% by weight of VC was added relative to the weight of the mixture of solvents.

Figure 4:
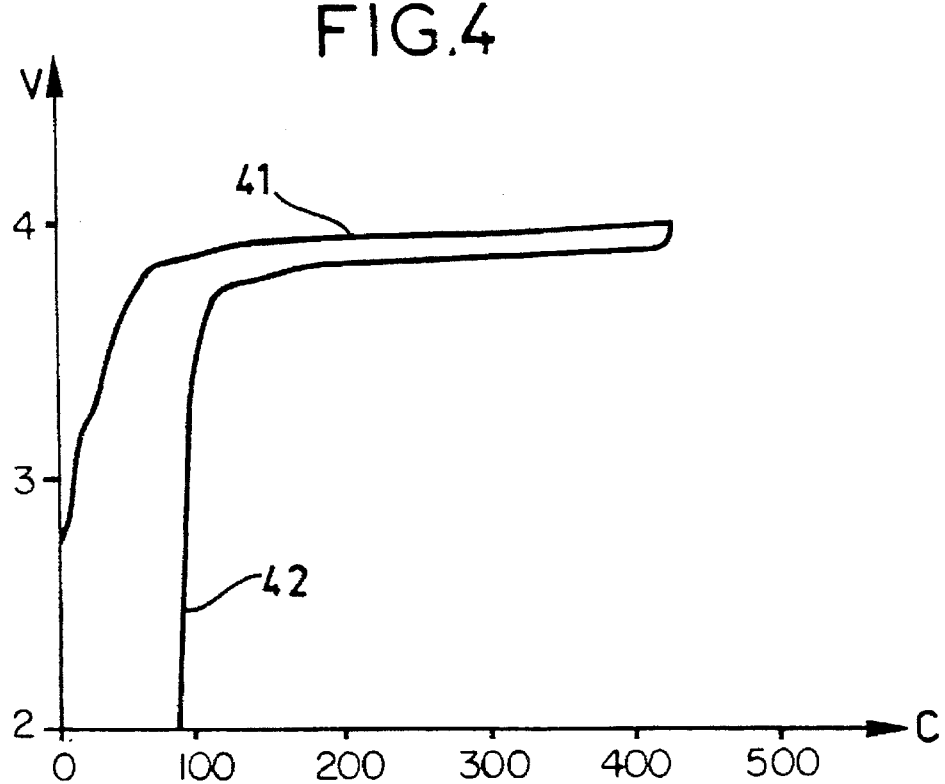
FIG. 4 shows a first charge and discharge curve for a variant of a cell in accordance with the present invention.

The test conditions were analogous to those given for Example 1. Curve 41 of FIG. 4 represents the first charge of the cell and exhibits no dip: in the presence of VC, carbon exfoliation no longer occurs. Curve 42 of FIG. 4 represents the subsequent discharge of the cell.

Discharge restored 330 mAh/g of the 420 mAh/g which had been charged, i.e., almost 79% of the charged capacity. The actual intercalated capacity was thus substantially larger for the cell of the invention.

The present invention is not limited to the embodiments described; the skilled person can derive a variety of variations without departing from the spirit of the invention. In particular, while the various examples describe button type cells, the invention is also applicable to cylindrical or prismatic cells.

We claim:

1. A rechargeable lithium electrochemical cell comprising:

a cathode, an anode containing a carbon-containing material with a degree of crystallinity which is greater than 0.8 and an electrolyte comprising a lithium salt and a mixture of at least two aprotic saturated organic solvents wherein at least one of the two solvents contains a carbonate, of which the first solvent has a high dielectric constant and the second solvent has low viscosity and is selected from the group consisting of an ether, a diethyl carbonate, a dimethyl carbonate, a dioxolane, a dioxolane derivative, a tetrahydrofuran, a tetrahydrofuran derivative, and a propylene oxide, characterized in that the electrolyte further contains a soluble compound which is a carbonate containing at least one unsaturated carbon-carbon bond, and which can be reduced at the anode at a potential of more than 1 volt with respect to lithium to form a passivation layer.

2. A cell according to claim 1, in which said compound is selected from vinylene carbonate and its derivatives.

3. A cell according to claim 2, in which said compound is added in a proportion of 0.01% to 10% by weight of said mixture of solvents.

4. A cell according to claim 1, in which said first solvent is selected from ethylene and propylene carbonates, dipropyl carbonate, acid anhydrides, n-methyl pyrrolidone, n-methyl acetamide, n-methyl formamide, dimethyl formamide, γ-butyrolactone, acetonitrile, sulfolane, dimethyl sulfoxide and dimethyl sulfite.

5. A cell according to claim 1, in which said lithium salt is selected from lithium perchlorate, lithium hexafluoroarsenate, lithium hexafluorophosphate, lithium tetrafluoroborate, lithium trifluoromethane sulfonate, lithium trifluoromethane sulfonimide, and lithium trifluoromethane sulfone methide, and their mixtures.

6. A cell according to claim 1, in which said cathode is selected from a transition metal based cathode selected from lithiated oxides of manganese, nickel, and cobalt, and their mixtures.

7. The cell of claim 1, wherein the second solvent is an ether.

8. The cell of claim 1, wherein the second solvent is a diethyl carbonate.

9. The cell of claim 1, wherein the second solvent is a dimethyl carbonate.

10. The cell of claim 1, wherein the second solvent is a dioxolane.

11. The cell of claim 1, wherein the second solvent is a dioxolane derivative.

12. The cell of claim 1, wherein the second solvent is a tetrahydrofuran.

13. The cell of claim 1, wherein the second solvent is a tetrahydrofuran derivative.

14. The cell of claim 1, wherein the second solvent is a propylene oxide.

* * * * *